(12) United States Patent
Torres et al.

(10) Patent No.: US 12,413,255 B2
(45) Date of Patent: Sep. 9, 2025

(54) TRANSMITTER ARRANGEMENT, TRANSCEIVER, RADIO COMMUNICATION SYSTEM AND METHOD

(71) Applicant: Telefonaktiebolaget LM Ericsson (publ), Stockholm (SE)

(72) Inventors: Florent Torres, Malmö (SE); Christian Elgaard, Lund (SE); Stefan Andersson, Flyinge (SE); Henrik Sjöland, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 212 days.

(21) Appl. No.: 17/919,526

(22) PCT Filed: Apr. 17, 2020

(86) PCT No.: PCT/EP2020/060850
§ 371 (c)(1),
(2) Date: Oct. 17, 2022

(87) PCT Pub. No.: WO2021/209151
PCT Pub. Date: Oct. 21, 2021

(65) Prior Publication Data
US 2023/0179237 A1    Jun. 8, 2023

(51) Int. Cl.
*H04B 1/04* (2006.01)
(52) U.S. Cl.
CPC ... *H04B 1/0458* (2013.01); *H04B 2001/0408* (2013.01)
(58) Field of Classification Search
CPC . H04B 1/02; H04B 1/0458; H04B 2001/0408
(Continued)

(56) References Cited

U.S. PATENT DOCUMENTS

| 7,659,795 B2 * | 2/2010 | Hikita | H03H 9/725 |
| | | | 333/132 |
| 2002/0011954 A1 | 1/2002 | Judd et al. | |

(Continued)

FOREIGN PATENT DOCUMENTS

| CN | 1886906 A | 12/2006 |
| CN | 101167249 A | 4/2008 |

(Continued)

OTHER PUBLICATIONS

International Search Report and the Written Opinion of the International Searching Authority, issued in corresponding International Application No. PCT/EP2020/060850, dated Dec. 18, 2020, 8 pages.

(Continued)

*Primary Examiner* — Hirdepal Singh
(74) *Attorney, Agent, or Firm* — Rothwell, Figg, Ernst & Manbeck, P.C.

(57) ABSTRACT

The present invention relates inter alia to a transmitter arrangement (1), in particular for radio communication, comprising at least two antenna elements (31, 32), spaced apart by a defined distance and a differential output amplifier (20) with a first output (21) coupled to a first (31) of the at least two antenna elements (31, 32) and with a second inverted output (22) coupled to a second (32) of the at least two antenna elements (31, 32). A first transmission line element (50) is arranged between at least one of the first and second outputs (21, 22) and the respective one of the at least two antenna elements (31, 32) and is configured such that signals applied to respective input taps (310, 320) of the at least two antenna elements (31, 32) are substantially in-phase with each other.

20 Claims, 10 Drawing Sheets

(58) Field of Classification Search
USPC .................................................... 455/552.1
See application file for complete search history.

(56) References Cited

U.S. PATENT DOCUMENTS

| | | |
|---|---|---|
| 2003/0071761 A1 | 4/2003 | Judd |
| 2005/0110700 A1 | 5/2005 | Terry |
| 2005/0277399 A1 | 12/2005 | Kronberger et al. |
| 2009/0066558 A1* | 3/2009 | Ikramov .................. G01S 13/04 342/28 |
| 2009/0115515 A1 | 5/2009 | Van Der Heijden et al. |
| 2013/0027272 A1 | 1/2013 | Karthaus |
| 2016/0036125 A1* | 2/2016 | Gupta .................. H01Q 3/2652 342/369 |
| 2016/0182006 A1* | 6/2016 | Larson .................... H03H 7/21 333/132 |
| 2016/0377557 A1* | 12/2016 | Kimura .................. G01N 22/02 324/638 |
| 2020/0119785 A1 | 4/2020 | Varatharaajan et al. |
| 2020/0321677 A1* | 10/2020 | Ali ........................ H01Q 1/2283 |

FOREIGN PATENT DOCUMENTS

| | | |
|---|---|---|
| CN | 101867095 A | 10/2010 |
| CN | 103718376 A | 4/2014 |
| CN | 110999107 A | 4/2020 |
| EP | 2017646 A1 | 1/2009 |
| EP | 3117777 A1 | 1/2017 |
| JP | 2005-341594 A | 12/2005 |
| WO | 2019/209604 A1 | 10/2019 |

OTHER PUBLICATIONS

Von Butovitsch et al. "Advanced antenna systems for 5G networks" Advanced antenna system for 5G Network Whitepaper—Ericsson, 2021, 9 pages.
Xu Bo, "Design of Radar Echo Signal Simulator", Athesis submitted to Xidian Uiversity, Jun. 2018 (with English abstract) (74 pages).
Pan, et al., "Digital Linearization of Multiple Power Amplifiers in Phased Arrays for 5G Wireless Communications", 2018 IEEE International Symposium on Signal Processing and Information Technology, Feb. 17, 2019, pp. 247-251 (5 pages).

* cited by examiner

TRANSMITTER ARRANGEMENT, TRANSCEIVER, RADIO COMMUNICATION SYSTEM AND METHOD

CROSS REFERENCE TO RELATED APPLICATION(S)

This application is a 35 U.S.C. § 371 National Phase Entry Application of PCT/EP2020/060850, filed Apr. 17, 2020, designating the United States, the disclosure of which is incorporated herein by reference in its entirety.

TECHNICAL FIELD

The invention relates to a transmitter arrangement in particular for radio communication and to a transceiver having the transmitter arrangement. The invention also relates to radio communication system and to a method for radio communication.

BACKGROUND 5G base stations are using beamforming technology for transmitting radio signals to a user equipment, UE and also receiving radio signals from such UE. Beamforming technology is also used in defense and satellites applications. The basic principle of beamforming is the combination of signal in an antenna array to electronically focus a beam—and then concentrate the power to a desired direction—with no physical antenna movement.

Beamforming can be used for multiple input/multiple output, MIMO communication. Two-dimensional beamforming combination (Elevation/Azimuth) enables the base station to transmit radio signal in a relatively narrow beam within a certain horizontal and vertical angle.

In order to perform beamforming, antenna arrays systems, AAS are used. To achieve a high output power, each antenna or sub-array is generally connected to one power amplifier, PA. In addition to the antenna arrays, modern Complementary Metal-Oxid Semiconductor, CMOS technologies provides a high level of integration as well as a low cost of production. However, advanced CMOS technology nodes show limitations on the supply voltage and available voltage headroom levels. This limits the achievable power of individual power stages in a power amplifier of a transmitter. The combination of two power stages as with a differential topology boosts the output power with ideally 3 dB to alleviate this issue. Differential topology in power amplifiers also provides a virtual ground and thus improves PA stability compared to single-ended design that is sensitive to ground return path parasitics.

While transmitters are designed differentially, single-ended antennas are generally used in AAS to limit the size of the antennas in the system. The antenna array is generally implemented on a printed circuit board, PCB. Therefore, a differential to single-ended conversion is needed between the transmitter and the antenna. However, current solutions often suffer from various drawbacks, including but not limited to degradation in the overall Tx output power and phase imbalances.

SUMMARY

It is an object of the present disclosure to mitigate, alleviate or eliminate one or more of the above-identified deficiencies and disadvantages in the prior art and solve at least the above-mentioned problem. This object is solved by the subject matter of the independent claims.

According to some aspects, a transmitter arrangement is provided, in particular for radio communication that comprises
- at least two antenna elements, spaced apart by a defined distance;
- a differential output amplifier with a first output coupled to a first of the at least two antenna elements and with a second inverted output coupled to a second of the at least two antenna elements;
- a first transmission line element arranged between at least one of the first and second outputs and the respective one of the at least two antenna elements;
- wherein the first transmission line element is configured such that signals applied to respective inputs of the at least two antenna elements are substantially in-phase with each other.

The proposed radio transmitter arrangement performs a differential to single-ended conversion by introducing a 180° phase shift on one of the differential paths of a differential amplifier in the transmitter with a low-loss transmission-line and connecting each differential path to one antenna, forming a 2×1 sub-array. The transmission line element may comprise no or only a very small power loss. Signal combination then takes place in the air.

Therefore, no additional and lossy conversion element, like a balun is needed. With careful design of the first transmission line element amplitude mismatch between the first and second antenna elements are negligible and do not negatively affect most applications.

In some aspects, the first transmission line element may be arranged on a substrate, on which also the antenna elements are arranged. Such substrate can include a PCB for example.

Arranging the first transmission line element and the first and second antenna elements on the substrate enables the reduction of space and a more simplified producing method with less steps involved.

According to some other aspects, the first transmission line element is configured to cause a phase shift of substantially 180° or odd multiples thereof of a signal, in particular of a center frequency of said signal applied thereto. The inventors recognized that ensuring the phase of both signals to be in-phase with each other at the input of the respective antenna elements is sufficient to perform a differential to single-ended conversion when the signals are combined in air. Hence, one may utilize different phase shift elements as long as the above-mentioned requirement is met. Consequently, such approach provides more flexibility when producing larger arrays of antenna elements.

According to some further aspects, the at least two antenna elements have a center-to-center distance substantially equal to half of a center frequency wavelength in air of a signal applied thereto. Similar, the first transmission line element may comprise an electrical length that corresponds to substantially half of a center frequency wavelength of a signal applied thereto. Hence, various sub-arrays can be optimized for the respective center frequencies.

Some further aspects relate to a transmitter arrangement with several antenna elements. Such transmitter arrangement may comprise:
- a plurality of n antenna elements, particularly arranged in a single row or column, wherein n is an even number larger than 2; and wherein each of every second of the antenna elements are coupled to the second output of the differential output amplifier;
  one or more second transmission lines elements arranged between the second outputs and every second of the antenna elements except the second antenna element such that a signal applied to respective inputs of the second and the even antenna elements are in-phase.

Additional antenna elements in a transmitter arrangement as proposed above may be suitable to cover various 5G and other user scenarios, in which different beam steering requirements must be fulfilled. Apart from this aspect, the proposed solution enables a further reduction of the number power amplifiers used in such arrangement.

A similar aspect concerns a transmitter arrangement that further comprises a plurality of pairs of antenna elements, wherein
  a first antenna element of a pair of antenna elements is coupled via a respective first of a second transmission line to the first antenna element or a first antenna element of a previous pair of antenna elements; and
  a second antenna element of a pair of antenna elements is coupled via a respective second of the second transmission line to the second antenna element or a second antenna element of a previous pair of antenna elements; and
wherein the second line transmission elements are configured such that a signal applied to respective inputs of the pair of antenna elements are in-phase.

Based on the actual requirements and needs, various designs for the first and/or one or more second transmission line elements are possible. For example, the transmission line elements may comprise at least one of
  a CWG, coplanar waveguide, arranged on a substrate;
  a microstrip arranged on the substrate;
  a substrate integrated waveguide;
  a twinstrip arranged on the substrate;
  a stripline arranged in the substrate;
  a finline arranged in the substrate;
  a slotline arranged on the substrate; and
  one or more lumped elements arranged on a PCB substrate.

According to some aspects, the first and/or one or more second transmission line elements comprise an inductor element arranged in a signal path and two capacitors to form a π-configuration. Alternatively, a T-section or a lumped/distributed transmission line on a substrate can be used for a phase shift of a signal.

In this regard, it may be suitable in some aspects, if the first and/or one or more second transmission line elements comprises an adjustment input to adjust a phase shift of a signal applied thereto. Likewise, in case of lumped elements, some of the elements may be adjustable electronically or mechanically. Such adjustment functionality may support to compensate imbalance or other distortion that could otherwise result in a mismatch during the differential—to-single ended conversion.

Some aspects concern the arrangement of the various elements on a common substrate. In some aspects, the first and/or second transmission line elements and the at least two antenna elements are arranged on or in a common substrate. Generally, the antenna elements and the transmission line elements as well as in some aspects also the transmitter can be arranged on or in a common substrate. The substrate may comprise a printed circuit board with a suitable material. This provides a space efficient and highly integrated board with all key elements assembled in a single production line. Consequently, the board can be optimally designed and produced for the intended purpose with all required components.

Several combinations and alternatives of such arrangements are possible. According to some other aspects, the differential output amplifier is arranged in a semiconductor body in a package, wherein the package is arranged together with the at least two antenna elements on a common substrate. According to some aspects, the first transmission line element is arranged within one of the semiconductor body and the package.

According to some aspects, the transmitter comprises an impedance matching configured to match an impedance of the first and second output of the differential output amplifier with the respective inputs of the at least two antenna elements. This will improve the match with the respective elements reducing the power loss due to reflection and mismatch. In this regard, the impedance matching element may comprise one of:
  a transmission line transformer arranged between the first and/or one or more second transmission line element and the respective antenna element, or coupled to outputs of the differential power amplifier;
  a matching network, in particular an adjustable matching network coupled to outputs of the differential output amplifier.

The second aspect of this disclosure relates to a transceiver comprising a transmitter arrangement as disclosed previously. It further comprises
  a differential input amplifier for amplifying a signal received by the at least two antenna elements,
  wherein each of the antenna elements is coupled to a respective input of the differential input amplifier; and
  a Transmit/Receive-switch, or TRx-switch that is arranged in a signal path between the respective differential input and output amplifier and the at least two antenna elements.

The proposed transceiver can be used to transmit and receive signals via single-ended antennas and perform a differential-to-single-ended or single-ended-to-differential conversion of the respective signal. Hence, the same antenna array can be used for transmitting and receiving signals, particularly signals that are time-division duplexed. Differential signals at the receiver can be amplified and will be less affected by certain distortions than single-ended signals.

In some aspects, the transceiver may comprise a matching network in a signal path between the TRx-switch and the differential input amplifier. The matching network may be an adjustable matching network. Such network can match an impedance mismatch in the respective transmitter and receiver path. Particularly, an impedance mismatch between the antenna elements and the amplifier of the receiver or the transmitter path can be individually optimized. Adjustable matching networks being configured to adjust the impedance in the respective paths may enable the transceiver to react upon time dependent distortion caused by weather or other effects such as users or objects coming in close proximity to the antennas.

In some other aspects, the differential input amplifier and the differential output amplifier are arranged in a common semiconductor body, thus reducing size of the arrangement. Both differential input amplifier and the differential output amplifier may be arranged on the same substrate as the antenna elements.

A third aspect of this disclosure shows a radio communication system, comprising a plurality of transceivers or transmitter of any of the preceding claims, wherein the at least two antenna elements of the plurality of transceivers or transmitter are arranged on a common substrate forming an array of antenna elements. This will provide a highly integrated front end of a base station, BS or a UE.

In some aspects the at least two antenna elements are arranged in a substantial vertical direction with respect to the position of the common substrate. Arranging the antenna elements in a vertical direction will have a reduced effect on the beam during beam steering in horizontal direction. This might be suitable when beam steering primarily in the horizontal direction, that is along the azimuth.

In an aspect, an antenna element of a first transceiver or transmitter is spaced apart from an adjacent antenna element of a second transceiver or transmitter by a distance corresponding to the distance between the at least two antenna elements of the first or second transceiver or transmitter. This structure may form an X×Y matrix of antenna elements, wherein to or more adjacent antenna elements are coupled to a differential amplifier. The overall number of amplifiers in this array is reduced.

A fourth aspect of this disclosure illustrates a method for radio communication comprising the steps of:
  amplifying a differential signal having a first component and a second inverted component;
  shifting a phase of one of the amplified first component and the amplified second inverted component;
  applying the phase-shifted amplified first component or second inverted component to a second antenna element;
  applying the other one of the amplified first component or second inverted component to a first antenna element;
  wherein shifting the phase comprises shifting the phase such that the phase of the amplified phase-shifted component at the second antenna element is in-phase with the amplified component at the first antenna element.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
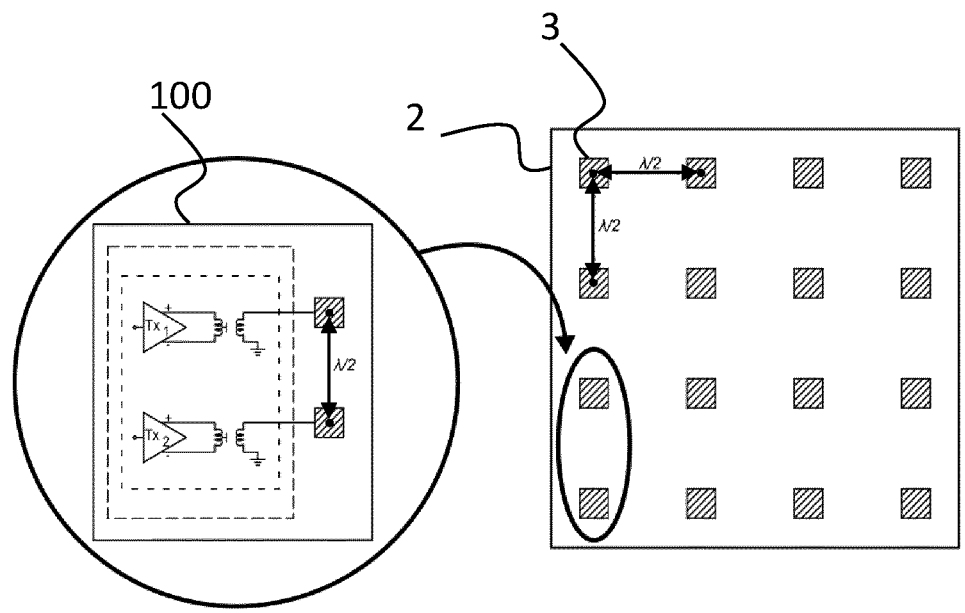
FIG. 1 shows a transmitter arrangement using balun for a differential to single-ended conversion.

Aspects of the present disclosure will be described more fully hereinafter with reference to the accompanying drawings. The arrangement, transceiver, system and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards a transmitter arrangement with an improved differential to single-ended conversion, a transceiver and a radio communication system with such transmitter or transceiver. As part of the development of the example embodiments presented herein, a problem will first be identified and discussed.

As discussed previously 5G base stations are using beamforming technology, which is also known from various defense and satellites applications. For beamforming, one often uses antenna array system, AAS, whereas a signal to be transmitted is split, amplified and distributed among various antennas. The power amplifiers used to amplify the signals are often implemented in CMOS technology as it allows for high integration and low-cost production. However, advanced CMOS technology nodes show limitations on the supply voltage and available voltage headroom levels. This limits the achievable power of individual power stages in a power amplifier of a transmitter. The combination of two power stages as with a differential topology boost the output power with ideally 3 dB to alleviate this issue. Differential topology in power amplifiers also provides a virtual ground and thus improves PA stability compared to single-ended design that is sensitive to ground return path parasitics.

While transmitters are designed differentially, antenna arrays system are focusing on single-ended antennas to limit the size of the antennas in the system. Therefore, a differential to single-ended conversion is needed between the transmitter and the antenna.

FIG. 1 illustrates a classical antenna array system 2 implemented on PCB with an on-chip differential transmitter arrangement 100 connected to single-ended patch antenna elements 3 with the differential to single-ended conversion provided by a balun on-chip. The arrangement comprises a differential amplifier for each antenna element. The conversion is generally realized on the chip with a balun coupled between each amplifier and the respective antenna element. A balun can also provide impedance transformation for impedance matching between an antenna element and the TRx output. The antenna elements 3 are typically spaced by roughly half a wavelength (λ/2) distance in order to reduce the side lobes in the radiation pattern.

However, the use of baluns is adding losses in the radio frequency, RF path. Those losses induce a degradation in the overall Tx output power and efficiency. With the downscaling of deep submicron CMOS technology nodes and the increase of operating frequency, the losses induced by on-chip baluns are increasing. Meanwhile, the supply voltage limitation on advanced CMOS technology is reducing the achievable output power in the Tx. In addition to the induced losses, a phase and amplitude imbalance can appear in the balun branches in some instances. Hence, it is not guaranteed in all circumstances that two differential parts will have an exact 180° phase difference and the same amplitude. Moreover, on-chip baluns have a large area footprint while advanced technology nodes have a high price per millimeter-square.

To overcome these and other issues, the inventors proposed a solution, in which the differential to single-ended conversion is performed by introducing a 180° phase shift on one of the differential paths of the transmitter with a low-loss transmission-line element. Each differential path is connected to one antenna, forming a 2×1 sub-array. Therefore, no on-chip balun is needed, and the signal power combination takes place in the air. The proposed architecture can be easily implemented on a PCB enabling a high degree of integration and providing a high power efficiency compared to conventional solutions.

Figure 2A:
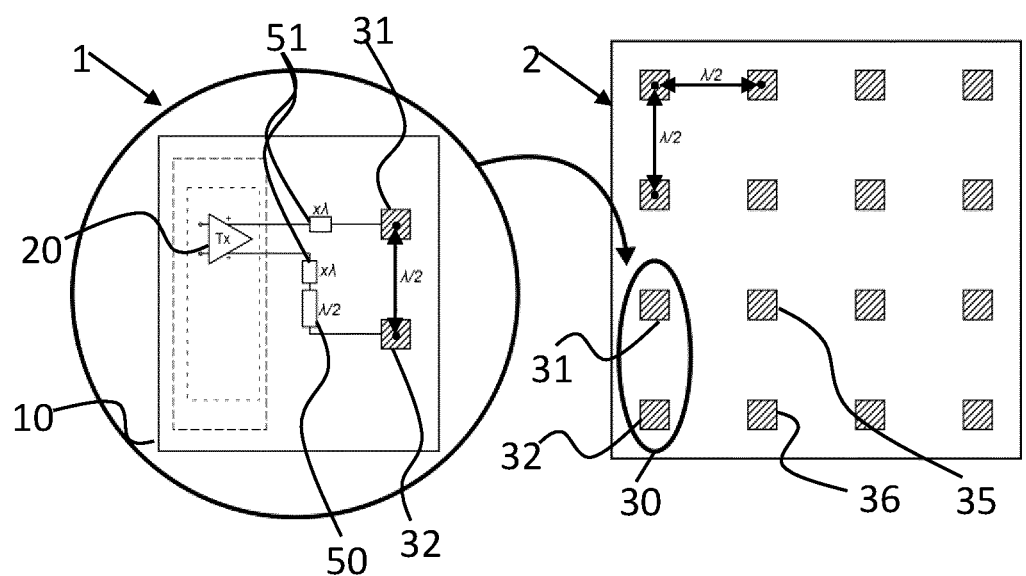
FIG. 2A illustrates a proposed transmitter arrangement having some aspect of the present disclosure.
Figure 2B:
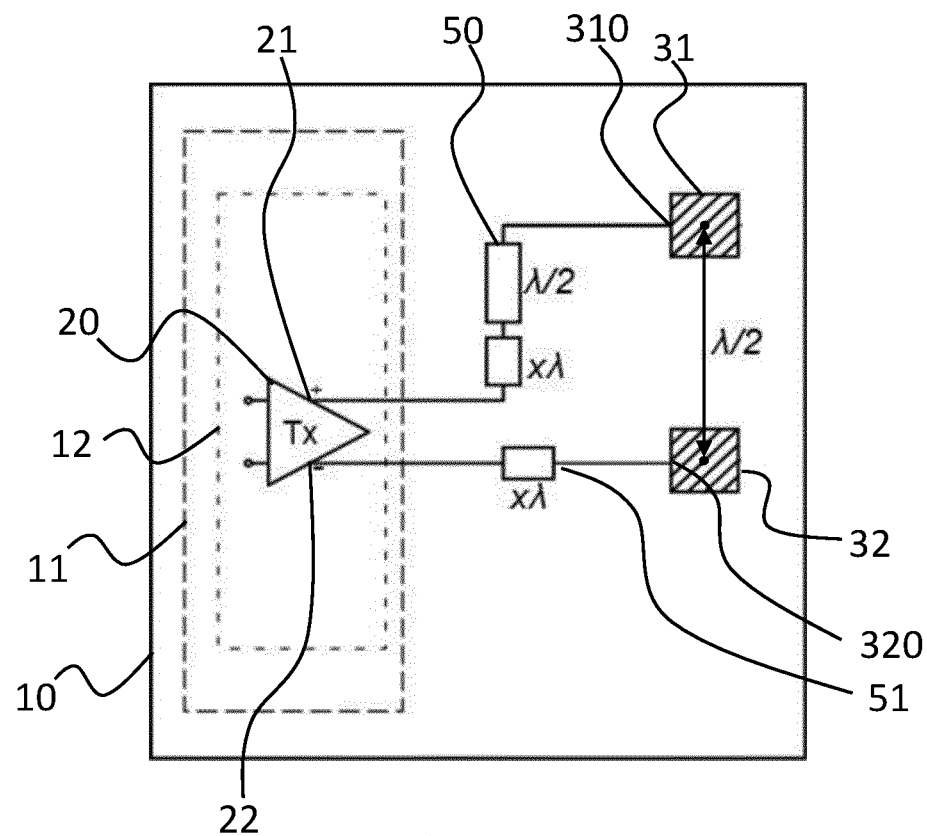
FIG. 2B illustrates an alternative to the proposed transmitter arrangement of FIG. 2A.

FIGS. 2A and 2B present an overview of the proposed solution in an antenna array system 2. The transmitter arrangement 1 comprises a differential output amplifier 20 arranged in a chip in a package. The package is arranged on a PCB substrate 10. The transmitter arrangement also comprises two antenna elements 31 and 32, which are also arranged on the PCB substrate. As illustrated in FIG. 2A, the distance of the adjacent edges of the two antenna elements 31 and 32 is set to of the signal to be transmitted. In FIG. 2B, the set distance of half of the wavelength of the center frequency is measured between the center points of the respective antenna elements.

Referring back to FIG. 2A, the transmitter arrangement is part of a larger antenna array 2. The various antenna elements 31, 32, 35 and 36 are paired together forming element pairs 30 and placed adjacent to each other with two elements being distanced by the above-mentioned distance of approximately half of the wavelength.

In accordance with the proposed principle, each of the output terminals of the differential amplifier is coupled to a respective one of the antenna elements. Particular, the non-inverted output 21 is connected to antenna element 31, the inverted output 22 is connected to antenna element 32 (see also FIG. 2B). The connection between the outputs of the respective differential amplifier and the antenna element pair is set such that the electrical length for both paths, the inverted and non-inverted path is equal to each other, except for the first transmission line segment 50. This aspect is illustrated by conductive line elements 51a, indicating that due to the length of the connection, a phase of signal is shifted and also losses may occur. The factor xλ in the transmission lines from the amplifier to the antenna element represent the electrical length of the distribution transmission lines. They can be equal or different for each antenna pair. For simplification purposes, it is assumed that the transmission lines are designed such that the signal amplifier by differential output amplifier 20 will have a 180° excess phase shift to one of the antenna elements.

In accordance with the present disclosure and referring to FIG. 2A, a phase shifting element 50 is introduced in the inverted path between the inverted output 22 of differential output amplifier 20 and antenna element 32. The phase shifting element 50 is configured such that the phase of signals applied at the inputs of the antenna elements 31 and 32 are equal. In other words, phase shifting element 50 is configured such that the signals applied to the respective inputs of the antenna elements 31 and 32 are in-phase.

Likewise and referring now to FIG. 2B, the phase shifting element 50 can also be arranged on the substrate 10 between non-inverted output 21 and input tap 310 of antenna element 31. Phase shifting element 50 is configured so that the signals provided by the differential output amplifier 20 at input taps 310 and 320 are in-phase.

The phase shifting element 50 can therefore be used not only to correct a phase mismatch due to for instance different electrical length between the different paths (e.g. element xλ may be different) but actually to shift the phase of the signal in one of the paths to match the phase of the respective other path at the antenna elements.

For the purpose of simplification it is assumed that the transmission lines 51a connecting the output terminals to the differential amplifier and the respective antenna elements are equal, causing the same phase shift and loss. Consequently, without phase shifting element 50, signals at the input of the antenna elements would have a phase shift of 180° to each other.

Figure 3:
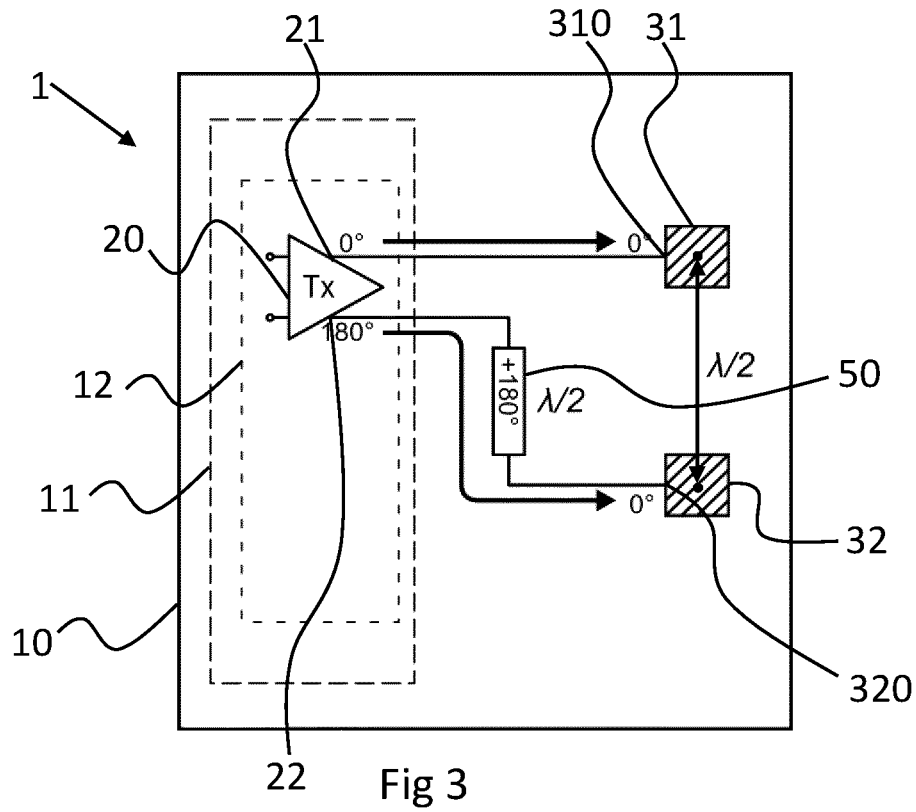
FIG. 3 shows a second exemplary embodiment of a transmitter arrangement according to some aspects of the present disclosure.

FIG. 3 then exhibits the proposed principle of a transmitter arrangement. An on-chip differential output amplifier 20 is connected to two on-PCB antennas (here patch antenna elements) 31 and 32 with a distance from center to center of half the wavelength of the center frequency. By definition, a differential amplifier of the transmitter output has two paths. A first path at non-inverted output 21 is defined as the path with 0° phase, the path at the inverted output 22 is defined to be the path with 180 phase. The path with 0° phase is directly connected to the corresponding antenna, with the routing from the semiconductor body 12 to the PCB through the package 11. This kind of routing on the RF path can have low loss.

A $\lambda/2$ transmission line is arranged on the PCB substrate in the path with 180° phase. This transmission line introduces a phase shift of 180°. Therefore, at the output of this transmission line on the antenna side, the phase becomes 0°. Thus, both signals on the antenna side have a 0° phase. The recombination of the two paths will be made in the air as both signals are in-phase. It should be noted that the phase shift induced by element 50 can be substantially 180° or odd multiples thereof. Hence, a phase shift of $(180°+360° *z)$ with z being a natural number would also suffice. The phase shift is considered at a center frequency of said signal applied thereto.

Compared to the classical differential to single ended combination on-chip with a balun, no additional loss is introduced on either RF path at chip. The $\lambda 2$ transmission line is implemented on PCB on the corresponding RF path, introducing low losses related to the extra routing to the antenna on this path. The combination of the signals takes place in air, which makes it in principle loss-less.

The exemplary table below shows the estimated losses for a coplanar waveguide transmission line routed on PCB.

| Frequency (GHz) | 2 | 30 | 45 | 70 | 95 |
|---|---|---|---|---|---|
| Losses per mm on PCB (dB/mm) | 0.015 | 0.056 | 0.069 | 0.086 | 0.1 |
| Wavelength $\lambda$ (mm) | 150 | 10 | 6.7 | 4.2 | 3.1 |
| $\lambda/2$ (mm) | 75 | 5 | 3.35 | 2.1 | 1.55 |
| Losses for a $\lambda/2$ line on PCB (dB) | 0.56 | 0.28 | 0.23 | 0.18 | 0.16 |

While the loss in a typical balun is about 1 dB at 30 GHz, they tend to increase with the downscaling of advanced CMOS technology nodes and with the increase of frequency, as the resistance is increased due to the skin effect and the smaller trace width at high frequency. The loss induced by a balun at the output of the transmitter chain is critical as it degrades the overall system efficiency.

In the proposed solution with the implementation of a phase shifting element, e.g. as an additional transmission line on PCB, low loss (0.28 dB at 30 GHz) is achieved regardless of the technology used for the chip, and since the loss is present at just one side of the differential output signal, the loss will be effectively divided by two, corresponding to a loss of 0.14 dB at 30 GHz. Moreover, the loss in a $\lambda/2$ transmission line will decrease when the frequency increases as illustrated in the above table. Therefore, an efficiency improvement is achievable at system level. For highly integrated solutions, in this case meaning many transmitters or transceivers connected to the antenna array, the reduced loss will provide greater flexibility when placing the power amplifiers with respect to the antennas, relaxing the cooling constraints on the system and reducing the overall power consumption.

Figure 4:
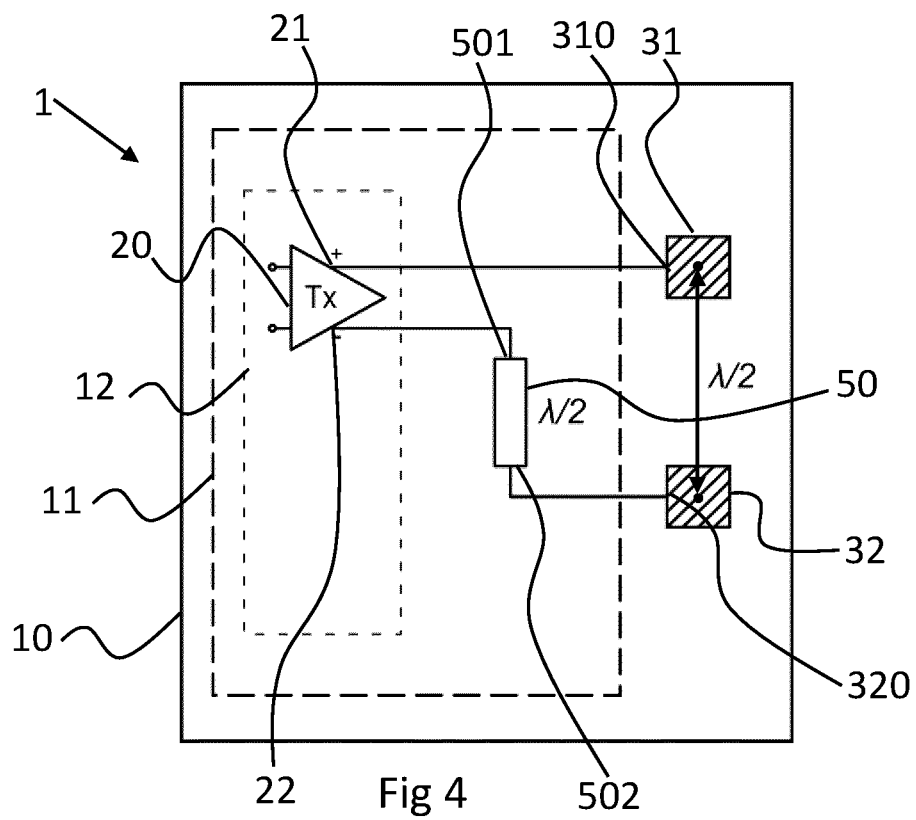
FIG. 4 illustrates a third exemplary embodiment of a transmitter arrangement according to some aspects of the present disclosure.
Figure 5:
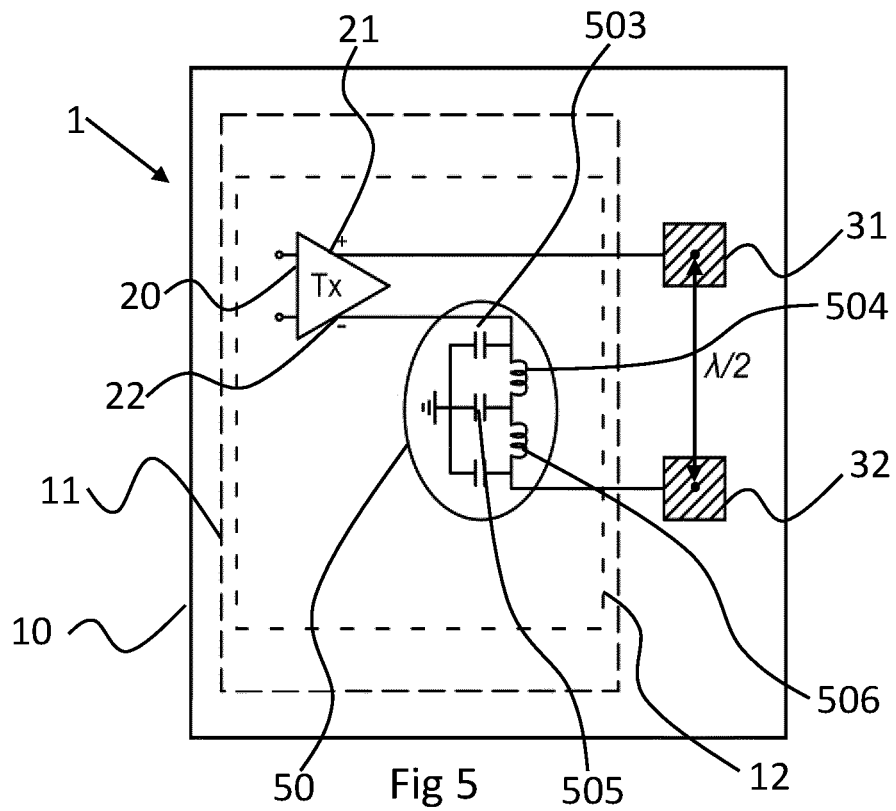
FIG. 5 shows fourth exemplary embodiment of a transmitter arrangement according to some aspects of the present disclosure.
Figure 17:
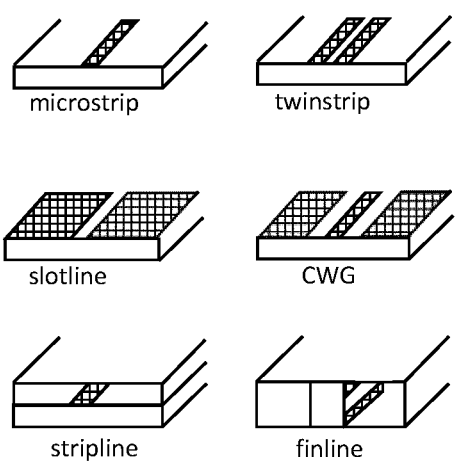
FIG. 17 illustrates exemplary embodiments of a phase shifting element in accordance with some aspects of the present disclosure.

Referring now to FIGS. 3, 4 and 5 illustrating various aspects for implementation of the phase shifting element 50 in the transmitter arrangement. Depending on requirements, space and design preferences, phase shifting element 50 can be implemented using various approaches. FIG. 17 illustrates several possibilities. For example, phase shifting element 50 can be implemented as a microstrip, twinstrip or slotline by etching or milling the transmission lines directly onto the PCB substrate. Similar approach can be taken using a CWG with a ground plane on the opposite side of the PCB substrate. For a solution of a stripline or finline, the conductive elements are arranged within a surrounding dielectric. Other implementations or combinations thereof are also possible.

With respect to the transmitter arrangement of FIG. 3, phase shifting element 50 is arranged on the PCB substrate 10, causing a 180° phase shift of the signal at output terminal 22, i.e., inverting the signal. In FIG. 4, the phase shifting element 50 is implemented as a transmission line within package 11. One terminal 501 of element 50 is connected to inverted output 22, the other terminal 502 is connected to a package connector (not shown) and coupled to input tap 320 of antenna element 32. Package 11 is arranged on the PCB substrate. This solution is suitable when the connection or the transmission lines on the PCB substrate between the package connector taps and the respective antenna elements are to be equal in electrical length. In both embodiments, the antenna elements are distance center-to-center by half wavelength of the center frequency of the signal to be transmitted.

Yet another solution for a phase shifting element 50 using lumped elements is illustrated in FIG. 5. The phase shifting element is implemented in the semiconductor body 12 itself, also comprising the differential output amplifier 20. Phase shifting element 50 forms a transmission line in a double 7c-configuration, although other network configurations are possible, for instance a T-network. The network comprises two inductive elements 504 and 506 arranged in the signal path, with capacitors connected to each tap and coupled to ground. Unlike the implementation of the transmitter arrangement in FIGS. 3 and 4, a design choice is made to distance the antenna elements 31 and 32 from edge to edge of the antenna elements by half of the wavelength of the center frequency.

Figure 6:
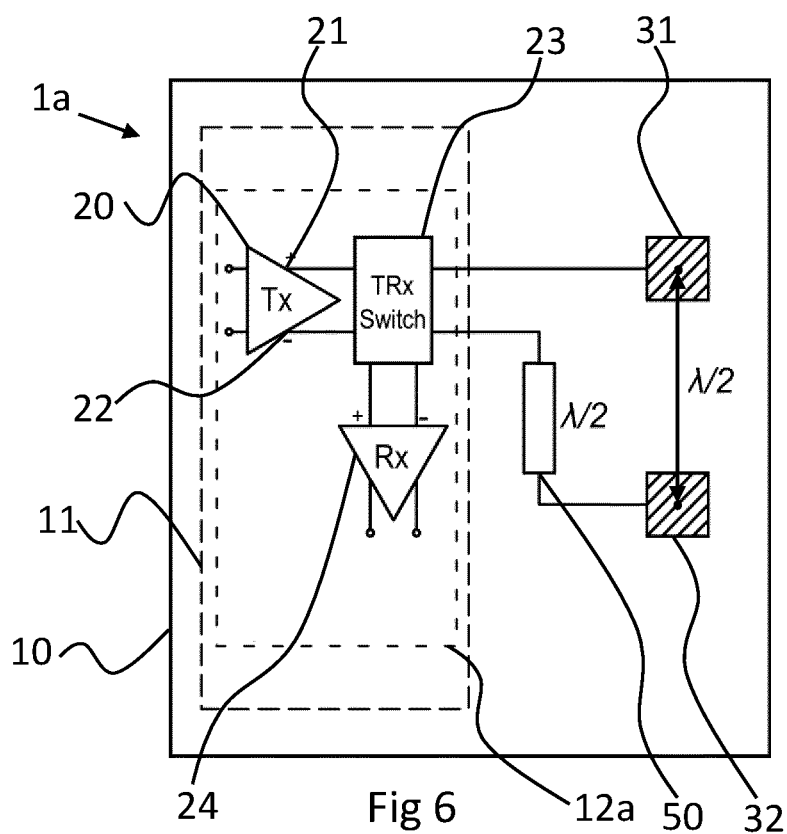
FIG. 6 illustrates a first exemplary embodiment of a transceiver according to some aspects of the present disclosure.

FIG. 6 shows another embodiment envisaging several aspects of the proposed principle in a complete differential transceiver, TRx 1a. The differential TRx 1a comprises a differential output amplifier 20, a differential input amplifier 24 and a differential Transmit/Receive switch, TRx-switch 23. For the purpose of this disclosure, differential output amplifier 20 may also referred to as differential transmitter amplifier 20 to differentiate this amplifier in the transmitter path from an amplifier in the receiver path. Likewise, differential input amplifier may be referred to as differential receiver amplifier. The differential transceiver is arranged in a semiconductor body 12a or chip 12a, which is integrated in a package arranged on the PCB substrate.

The switch 23 is used to commutate between two modes:
  The Tx mode where a signal flows from differential output amplifier 20 to the antenna elements 31, 32 to be transmitted.
  The Rx mode, where the signal flows from the antenna elements to the differential input amplifier 24 to amplify a received signal.

Similar to a transmitter arrangement in accordance with the proposed principle, a phase shifting element 50 is arranged in one of the signal paths to ensure that in the Tx mode the amplified signals to be transmitted are in-phase at the antenna elements. In Rx mode, the phase shifting element will shift the phase in one signal path, such that the signals received via antenna elements 31 and 32 are out-of-phase at the input/output taps of TRx-switch 23. Such an approach provides a solution for use in time division duplex, TDD applications in line with the 5G standard. A full TRx integration means that one differential switch and one differential Rx amplifier is connected to 2 antennas like for the Tx.

Figure 7:
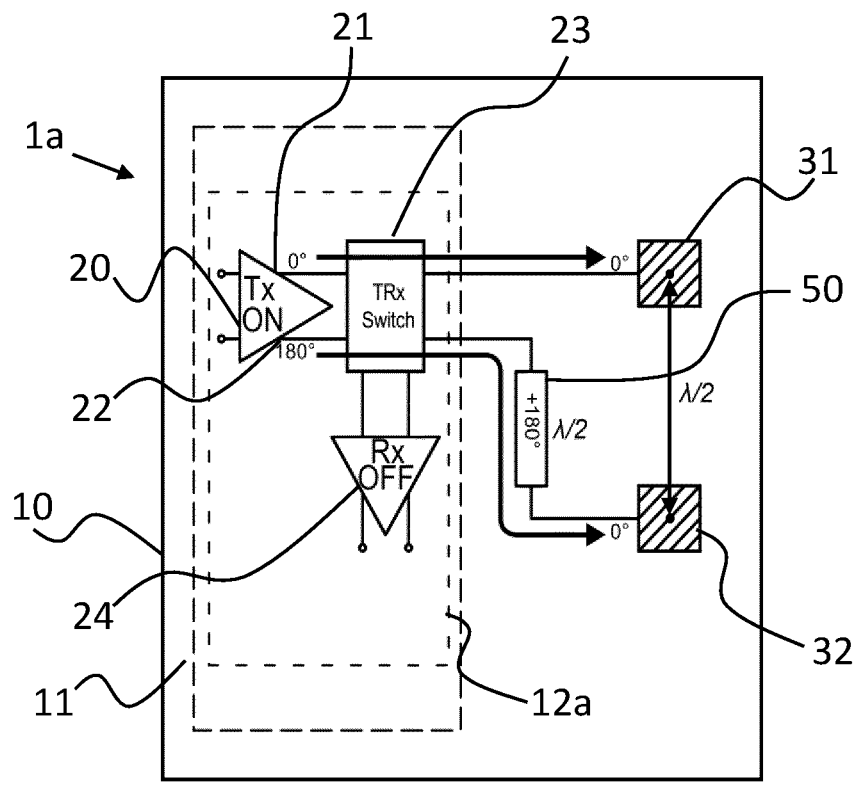
FIG. 7 illustrates a second exemplary embodiment of a transceiver in a Tx mode according to some aspects of the present disclosure.
Figure 8:
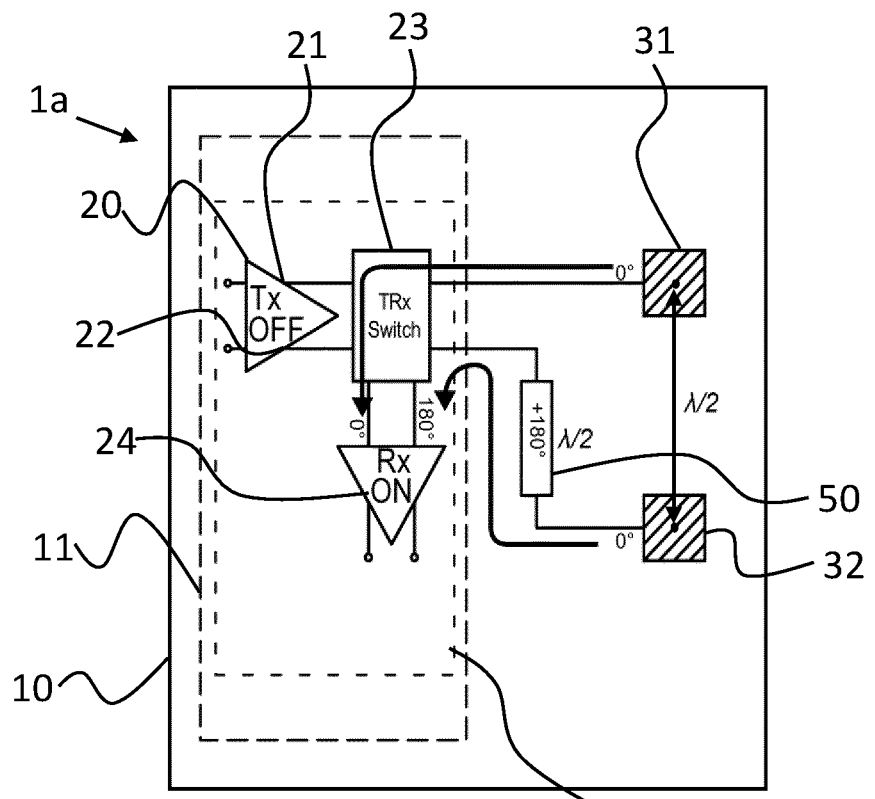
FIG. 8 shows the exemplary embodiment of a transceiver of FIG. 7 in an Rx mode according to some aspects of the present disclosure.

FIGS. 7 and 8 illustrate the signal flows for the transceiver in the Tx and Rx mode, respectively. During transmission that is when Tx is ON, the receiver amplifier is switched off. The TRx-switch 23 is placed in Tx mode and couples differential output amplifier 20 to the antenna elements. As previously disclosed, the RF path with 0° phase extends from output 21 through the TRx-switch 23, the package 11, PCB substrate 10 to the corresponding antenna element 31 with no phase shift (in reality there will of course be a phase shift, but we define this path as the reference, and it is just the phase shift difference between the two paths that matters).

The signal on the RF path with a 180° phase extends from inverted output 22 through the TRx-switch with no phase shift. The phase shift element 50 implemented as a transmission line element on PCB induces a 180° phase shift. As a result, the phase at the input of the antenna element becomes 0° at antenna element 31. Both signals at the antenna elements are then in-phase and thus the signals will be combined constructively in the air.

FIG. 8 illustrates the signal flow during Rx mode. In Rx mode, the differential output amplifier 20 is switched off or to a low power mode. The TRx-switch 23 is in an Rx position. A signal is received at both antenna elements and will be in-phase at the antennas. One of the RF paths (e.g. the one with elements 31) does not induce an excess phase shift and the antenna is directly connected to the TRx-switch 23 through package 11 and directed to the corresponding 0° input of differential input amplifier 24.

The other RF path comprises a $\lambda/2$ transmission line on PCB configured to induce a 180° phase shift. Consequently, the signal will be shifted by 180° at the output of the phase shifting element. Phase shifting element is then coupled via the TRx-switch 23 through the package to the corresponding 180° input of differential input amplifier 24. The signals at the input terminals of differential input amplifier 24 have a phase difference of 180° and thus can be processed in a differential amplifier operation. The phase shifting element 50 exhibits low losses compared to the classical solution involving a balun at the input of a receiver amplifier.

Figure 9:
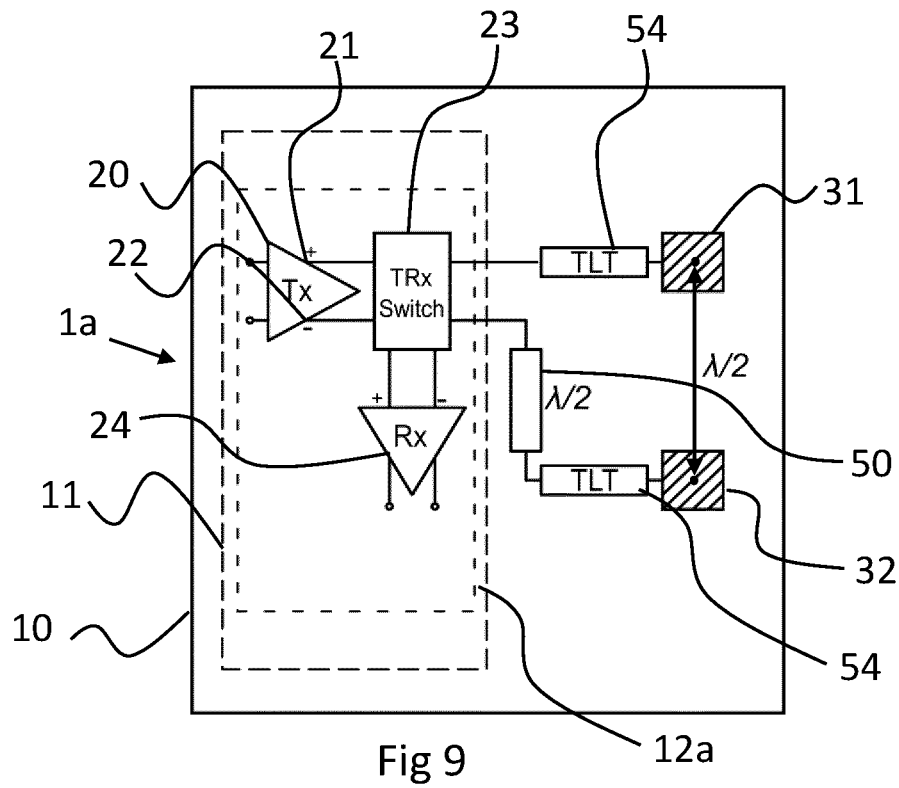
FIG. 9 shows third exemplary embodiment of a transceiver according to some aspects of the present disclosure.
Figure 10:
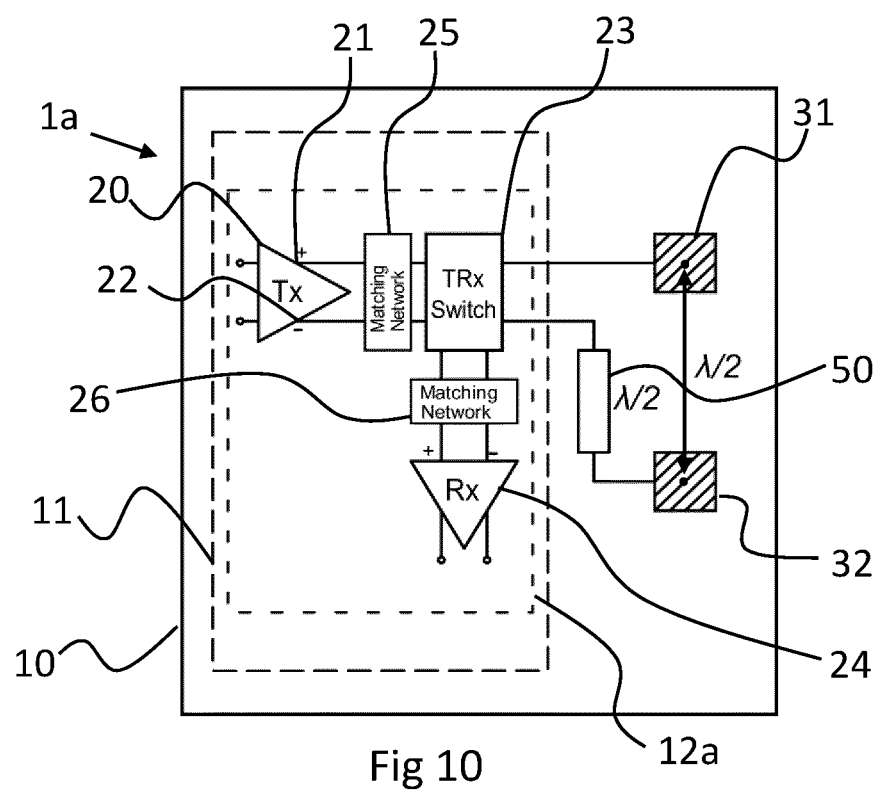
FIG. 10 shows fourth exemplary embodiment of a transceiver according to some aspects of the present disclosure.

Another aspect shown in FIGS. 9 and 10 takes a potential impedance mismatch into account. Such mismatch may exist between the antenna and the differential transmitter amplifier causing certain reflection of the signal to be transmitted reducing the overall strength of the transmitted signal. Conventionally, when using a balun, the balun may also achieve an impedance transformation in addition to the differential to single-ended conversion. FIG. 9 exhibits a different approach, in which transmission lines transformers TLT 54 on PCB are arranged in the respective paths to perform an impedance transformation on PCB, keeping the advantage of low losses for transmission line routing on PCB. The arrangement on the PCB substrate may allow the design of the TLT to match the antenna elements. Apart from TLT, other elements for impedance adjustment may be suitable as well. The TLT can also be placed at the other side of the phase shifter 50.

FIG. 10 illustrates a flexible solution, in which adjustable matching networks 25 and 26 are arranged within semiconductor body 12. Such on-chip impedance transformation can also be used as usually the Tx part of the transceiver is designed for a low impedance output while the Rx is generally designed for a higher input impedance. Consequently, both networks 25 and 26 are positioned between the TRx-switch and the respective differential amplifiers 20 and 24. The matching networks comprise an adjustment input (not shown) to flexibly adjust a mismatch of the impedance. For this purpose, a respective feedback may be provided, in which reflected power is determined and the network adjusted accordingly. An adjustable matching network can compensate for temporary mismatches, e.g. caused by weather or other conditions at the location of the BS or the UE. In order to reduce chip area, and sacrifice some flexibility, a single adjustable matching network can also be used at the antenna port of the TRx switch.

Figure 16:
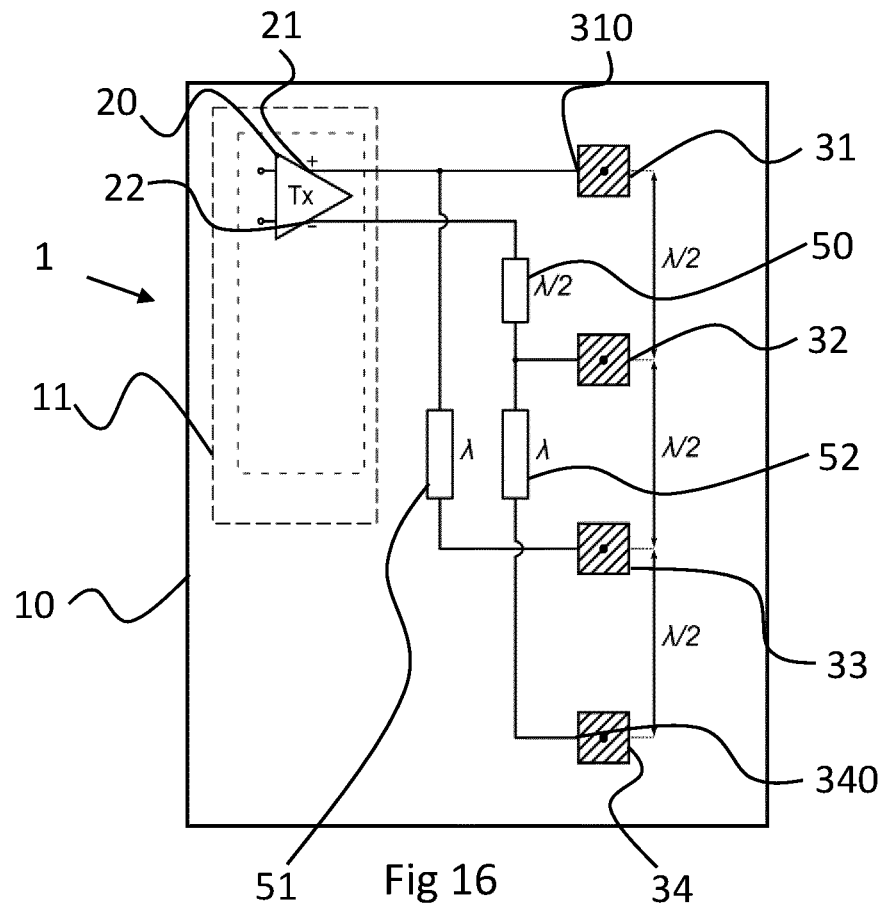
FIG. 16 illustrates an exemplary embodiment of a transmitter arrangement in accordance with some aspects of the present disclosure.

Referring now to FIG. 16. Apart from the solutions described previously, the transmitter arrangement and also the transceiver is not limited to a 2×1 subarray with two antenna elements. Rather a transmitter or transceiver can be connected to several antenna elements typically forming a single row or column. FIG. 16 illustrates an exemplary embodiment implementing some aspects of the present disclosure. The transmitter arrangement comprises a differential output amplifier 20 and a plurality of antenna elements, even in number arranged in a 1×n column. In the exemplary embodiment in total 4 antenna elements 31, 32, 33 and 34 are provided. The antenna elements are positioned on a PCB substrate such that the respective centers of adjacent elements are distanced by half of the wavelength $\lambda/2$ of the center frequency.

The antenna elements are coupled to the output of the differential output amplifier 20 in an alternating fashion. That is every first antenna element is connected to non-inverted output 21, and every second antenna element is coupled to the inverted output 22. As in various other embodiments, a phase shifting element 50 is positioned as a transmission line on PCB between antenna element 32 and inverted output 22. The arrangement of the antenna elements in such column or also in a row leads to different electrical length of the various elements as the distance between an element and the output of the differential output amplifier 20 differs. To compensate for such difference, further transmission line elements 51 and 52 are positioned between the additional elements and the output amplifier. More particular, element 33 and 34 may form another antenna pair with one antenna receiving the 0° signal, the other one the 180° signal. Antenna element 33 is connected to transmission line element 51 to element 31 and output 21, antenna element 34 connect to antenna element 32 and phase shifting element 50 by a transmission line element 52. Both transmission line elements are configured to adjust the phase of the respective signals applied at their inputs such that all signals applied to the antenna elements are in-phase.

Figure 11:
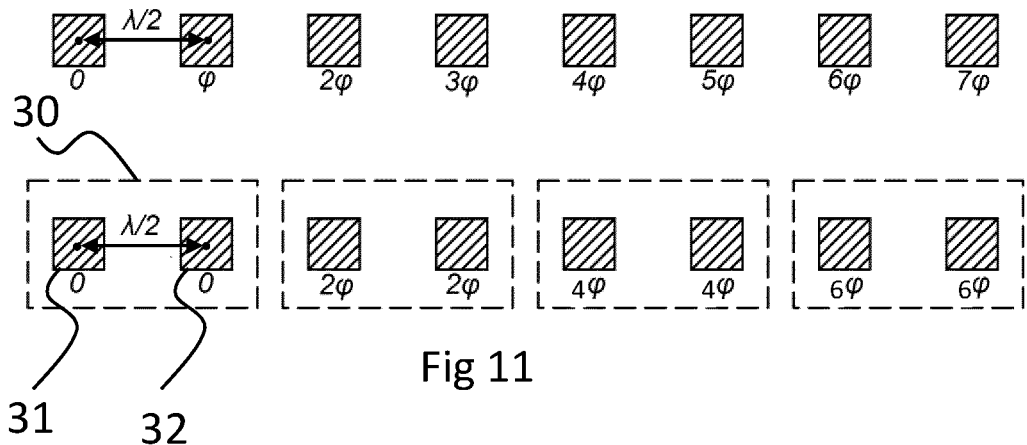
FIG. 11 illustrates an exemplary embodiment to combine antenna elements into a sub-array in accordance with some aspects of the present disclosure.
Figure 12:
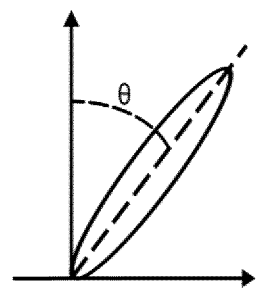
FIG. 12 is a schematic illustration of an AAS radiation plan and beam angle θ illustration.

Referring back to FIG. 11, which illustrates the arrangement in an antenna system of the transmitter or transceiver arrangement according to some aspects of the present disclosure. In a conventional 1×1 sub-array, each antenna is connected to a transceiver and the antennas are separated by a $\lambda/2$ distance to reduce the side lobes. Hence, there is a phase shift φ between adjacent antenna elements. In the proposed solution, a plurality of 2×1 or more general n×1 sub-arrays are provided, whereas n is the number of antenna elements belonging to the same sub-array. A single transceiver is connected to the antenna elements of each sub-array transmitting and receiving the same signal. This is leading to a higher power in the side lobes when the beam angle theta is non-zero (see FIG. 12) compared to the 1×1 antenna arrays. θ is the angle of the beam to the antenna orthogonal plane as shown in FIG. 12. The angle θ is controlled by the phase shift φ of the AAS.

Figure 13:
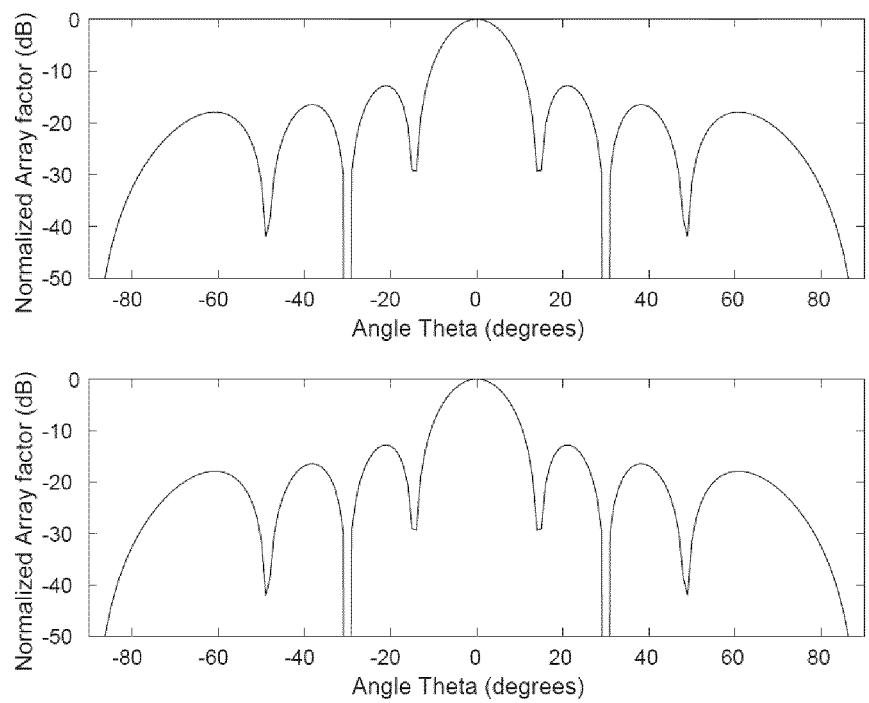
FIG. 13 shows some simulation results of a radiation pattern with a first beam angle θ for a transmitter according to some aspects of the present disclosure.
Figure 14:
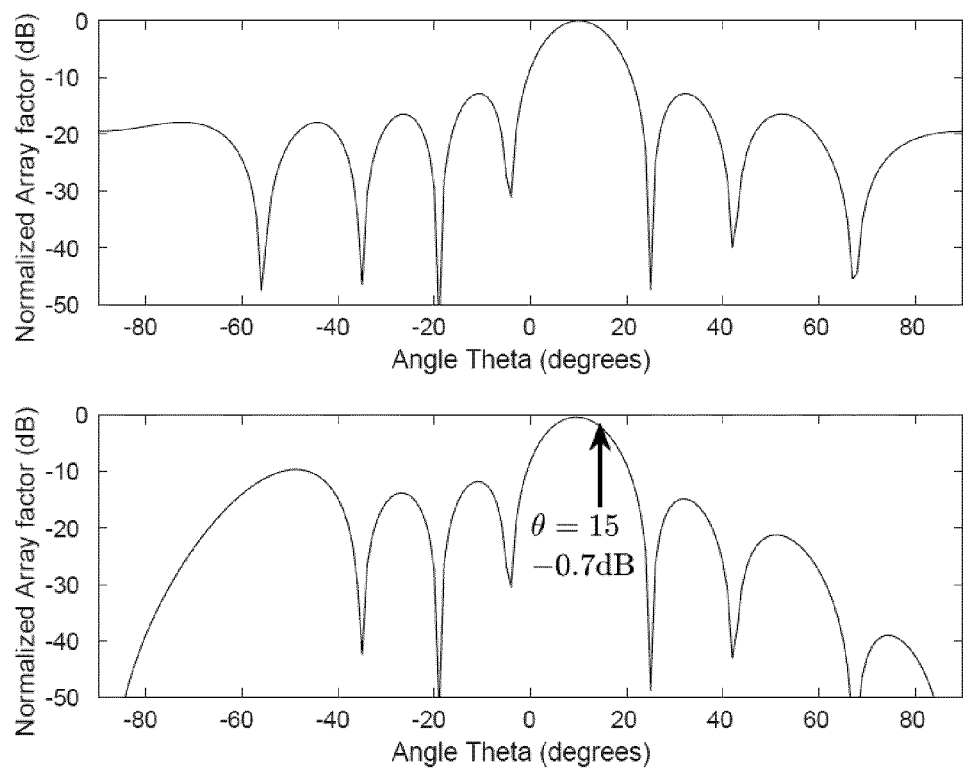
FIG. 14 shows some simulation results of a radiation pattern with a second beam angle θ for a transmitter according to some aspects of the present disclosure.

With respect to the signal strength in the side lobes and the behavior of a sub-array in accordance with the proposed principle, FIGS. 13 and 14 illustrate some simulation results. FIG. 13 shows the simulation results for a beam angle theta of 0°. The first diagram shows the simulation result for a 1×1 array that is in the conventional arrays. The diagram below exhibits the results of a 2×1 sub-array in accordance with some aspects of the proposed principle. As it is apparent for a beam direction of 0=0, that is the main lobe is orthogonal to the antenna plane, the signal strength in the side lobes are several dB smaller than the main lobe. Both sub-arrays show the same radiation pattern with low side lobe power, since all antenna array elements operate in phase for this beam direction. FIG. 14 shows the simulation results for a beam direction angle θ=10°. In this case, the radiation patterns differ for the two arrays. The main lobe is shifted as expected. In the 2×1 sub-array however, the side lobe centered at −50° shows a power of about −10 dB with respect to the main lobe, while in the 1×1 sub-array all the side-lobes power remain low. As a result the 2×1 subarray transmits more power in the side lobes, and for this beam direction the radiation pattern will be higher at around −50° than for the 1×1 subarray.

These behaviors visible in the simulation results may limit the achievable beam steering angle when a transmitter is connected to two or more antenna elements as shown in the various embodiments. For a 2×1 subarray for example, the simulations of FIGS. 13 and 14 indicate a suitable maximum beam angle range to be in the range of [−10; +10]°. It corresponds to a total beam steering angle of 20°. The range can be extended to around [−15; +15]° but will induce losses of around 0.7 dB, corresponding to a maximum beam steering of 30°. With the antennas in the sub-array forming a single row or column, the beam steering angle limitation affects only one of the two directions. For a horizontal arrangement of the sub-array, the beam steering angle is limited in the horizontal direction, and vice versa for a vertical arrangement of the sub-array. The respective other direction of the beam steering angle remains substantially unaffected.

Figure 15:
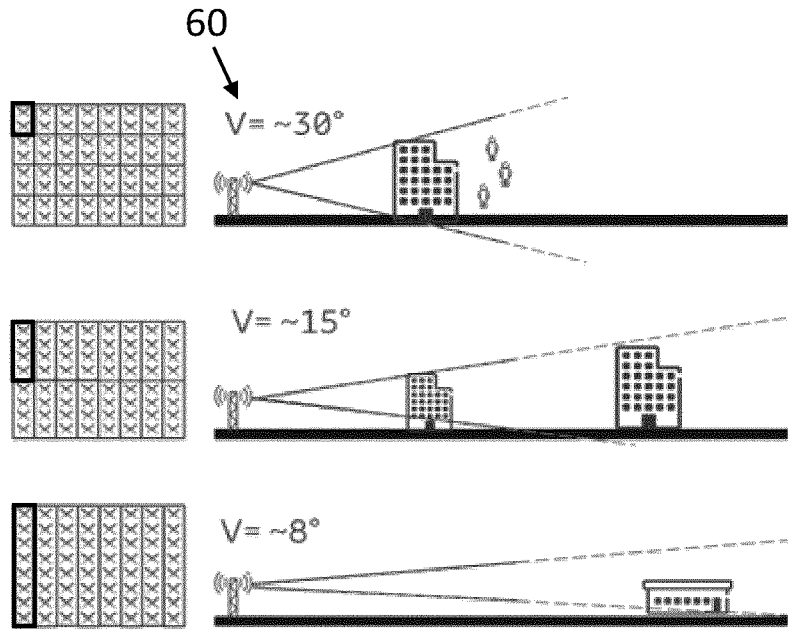
FIG. 15 illustrates several beam directions and beam steering angles depending on various sizes of antenna sub-arrays in accordance with some aspects of the present disclosure.

However, such a limitation is not critical for typical 5G AAS scenarios. FIG. 15 illustrates several use-cases for AAS in 5G scenarios. The upper drawing illustrates the so-called "dense urban high rise" scenario, for dense and vertical cities, in which a communication range between 200m and 500m is expected. Due to the dense area, a vertical angle of 30° is required. 2×1 sub-arrays are used for a total array featuring 4 vertical sub-arrays and 8 horizontal sub-arrays.

In the case of an "Urban low rise" scenario as depicted in the middle drawing, corresponding to a lot of cities around the world, a range between 500m and 1 km is expected as well as a vertical angle of 15°. 4×1 sub-arrays for an AAS featuring 2 vertical sub-arrays and 8 horizontal sub-arrays can be used in those areas.

Finally, the lowest drawing of FIG. 15 corresponds to a "suburban and rural" scenario, whereas a range over 1 km with a vertical beam angle of 8° is considered sufficient. 8×1 sub-arrays can be used in an AAS featuring 1 vertical and 8 horizontal sub-arrays.

The proposed transceiver with a minimum sub-array size of 2×1 is fully compatible with the AAS solutions presented in FIG. 16. The 20° beam steering achievable by the proposed solution makes it suitable for "urban low rise" and "suburban and rural" 5G scenarios. For the dense urban high rise areas, beam steering of 30° for the "dense urban high rise" is required. While the present disclosure can achieve such beam steering angles, some loss is expected on the radiation pattern as discussed with respect to FIGS. 13 and 14. However, as the transmission range is short for this scenario, the additional loss is not critical.

The various scenarios indicate that significant savings can be made while fulfilling the 5G standard requirements. Using n×1 sub-arrays where n is 2, 4 or 8 requires less power amplifiers for the transmitter and enable highly integrated transceivers. The overall power consumption is reduced while maintaining the signal quality. Already existing antenna elements can be re-used reducing development time and costs in production.

Figure 18:
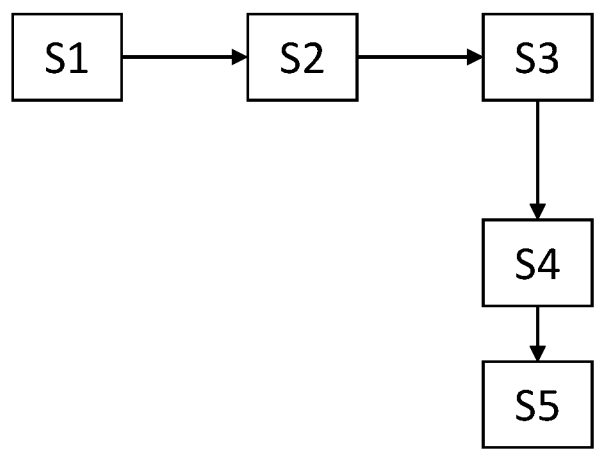
FIG. 18 illustrates an exemplary method for radio communication in accordance with some aspects of the present disclosure.

FIG. 18 illustrate an exemplary method for radio communication. In step S1, a differential signal having a first component and a second inverted component is amplified. The amplified components correspond to the signal to be transmitted. For a differential to single conversion over air in accordance with the proposed principle, a phase of one of the amplified components is now phase shifted in step S2. In subsequent step S3, the phase-shifted component of the amplified first component and second inverted component are applied to a second antenna element. Likewise is the other (not phase-shifted) component of the amplified first component or second inverted component applied to a first antenna element.

The phase shift is performed in such way in step S5 that the phase of the amplified phase-shifted component at the second antenna element is in phase with the amplified component at the first antenna element. In other words, the phase shift of one of the components is done such that both components are in phase at the antenna elements. The signal components are then combined over air.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

REFERENCE LIST 1 transmitter arrangement
2 antenna array system, AAS
3 antenna element
10 PCB substrate
11 package
12 semiconductor body, chip
20 differential output amplifier
21 inverted output
22 non-inverted output
23 TRx-switch
24 differential input amplifier
25, 26 matching network
30 sub array 31, 32 antenna element
33, 34 antenna element
35, 36 antenna element
50 phase shifting element
51, 52 transmission line element
51a conductive line element
54 impedance matching element
100 transmitter arrangement
310, 320 input taps
501, 502 terminals

The invention claimed is:

1. A transmitter arrangement for radio communication, comprising:
   at least two antenna elements, spaced apart by a defined distance;
   a differential output amplifier with a first output coupled to a first of the at least two antenna elements and with a second inverted output coupled to a second of the at least two antenna elements;
   a first transmission line element arranged between at least one of the first and second outputs and the respective one of the at least two antenna elements, the first transmission line element being configured such that signals applied to respective input taps of the at least two antenna elements are substantially in-phase with each other,
   wherein the first transmission line element is configured to cause a phase shift of substantially 180° or odd multiples thereof of a center frequency of said signal applied thereto.

2. The transmitter arrangement of claim 1, wherein the at least two antenna elements have a center to center distance substantially equal to half of a center frequency wavelength in air of a signal applied thereto.

3. The transmitter arrangement of claim 1, wherein the first transmission line element comprises an electrical length that corresponds to substantially half of a center frequency wavelength in air of a signal applied thereto.

4. The transmitter arrangement of claim 1, further comprising:
   a plurality of n antenna elements arranged in a single row or column, wherein n is an even number larger than 2; and
   wherein every second of the plurality of n antenna elements are coupled to the second inverted output of the differential output amplifier;
   one or more second transmission lines elements arranged between the second inverted outputs and every second of the plurality of n antenna elements except the second antenna element such that a signal applied to respective input taps of the second and the even antenna elements are in-phase.

5. The transmitter arrangement of claim 1, further comprising:
   a plurality of pairs of antenna elements, wherein
   a first antenna element of a pair of antenna elements is coupled via a respective first one of a second transmission line element to the first antenna element or a first antenna element of a previous pair of antenna elements; and
   a second antenna element of a pair of antenna elements is coupled via a respective second one of a second transmission line element to the second antenna element or a second antenna element of a previous pair of antenna elements;
   wherein the first and second of the second transmission elements are configured such that a signal applied to respective input taps of the pair of antenna elements are in-phase.

6. The transmitter arrangement of claim 4, wherein the first and/or the second transmission line elements comprises at least one of
   a CWG, coplanar waveguide, arranged on a substrate;
   a microstrip arranged on the substrate;
   a substrate integrated waveguide;
   a twinstrip arranged on the substrate;
   a stripline arranged in the substrate;
   a finline arranged in the substrate;
   a slotline arranged on the substrate; and/or
   one or more lumped elements arranged on a PCB substrate.

7. The transmitter arrangement of claim 4, wherein the first and/or the second transmission line elements comprises an inductor element arranged in a signal path and two capacitors to form a π-configuration or T-section.

8. The transmitter arrangement of claim 4, wherein, the first and/or the second transmission line elements comprises an adjustment input to adjust a phase shift of a signal applied thereto.

9. The transmitter arrangement of claim 4, wherein the first and/or second transmission line elements and the at least two antenna elements are arranged on or in a common substrate.

10. The transmitter arrangement of claim 1, wherein the differential output amplifier is arranged in a semiconductor body in a package, the package arranged together with the at least two antenna elements on a common substrate.

11. The transmitter arrangement of claim 10, wherein the first transmission line element is arranged within one of the semiconductor body and the package.

12. The transmitter arrangement of claim 1, further comprising an impedance matching element configured to match an impedance of the first and second output of the differential output amplifier with the respective input taps of the at least two antenna elements.

13. The transmitter arrangement of claim 12, wherein the impedance matching element comprises one of:
   a transmission line transformer arranged between the first and/or one or more second transmission line element and the respective antenna element; and/or
   a matching network, in particular an adjustable matching network coupled to outputs of the differential output amplifier.

14. A transceiver comprising a transmitter arrangement of claim 1 and further comprising:
   a differential input amplifier for amplifying a signal received by the at least two antenna elements, wherein each of the antenna elements is coupled to a respective input of the differential input amplifier; and
   a transmitter- & receiver-switch arranged in a signal path between the respective differential input and output amplifier and the at least two antenna elements.

15. The transceiver of claim 14, further comprising an adjustable matching network arranged in a signal path between the transmitter- & receiver-switch and the differential input amplifier.

16. The transceiver of claim 14, wherein the differential input amplifier and the differential output amplifier are arranged in a common semiconductor body.

17. A radio communication system, comprising a plurality of transceivers or transmitter of claim 1, wherein the at least two antenna elements of the plurality of transceivers or transmitter are arranged on a common substrate forming an array of antenna elements.

18. The radio communication system of claim 17, wherein the at least two antenna elements are arranged in a substantial vertical direction with respect to the position of the common substrate.

19. The radio communication system of claim 17, wherein an antenna element of a first transceiver or transmitter is spaced apart from an adjacent antenna element of a second transceiver or transmitter by a distance corresponding to the distance between the at least two antenna elements of the first or second transceiver or transmitter.

20. A method for radio communication comprising the steps of:
- amplifying a differential signal having a first component and a second inverted component;
- shifting a phase of one of the amplified first component and the amplified second inverted component;
- applying the phase-shifted component of the amplified first component and second inverted component to a second antenna element; and
- applying the other component of the amplified first component or second inverted component to a first antenna element;
- wherein shifting the phase comprises shifting the phase such that the phase of the amplified phase-shifted component at the second antenna element is in-phase of the amplified component at the first antenna element,
- and causing a phase shift of substantially 180° or odd multiples thereof of a center frequency of said signal.

* * * * *